(12) United States Patent
Ye et al.

(10) Patent No.: US 9,690,160 B2
(45) Date of Patent: Jun. 27, 2017

(54) LIQUID CRYSTAL LENS IMAGE FORMING DEVICE AND LIQUID CRYSTAL LENS IMAGE FORMING METHOD

(71) Applicant: Shenzhen Mercury Optoelectronics Research Institute, Shenzhen, Guangdong (CN)

(72) Inventors: Mao Ye, Guangdong (CN); Chunhui Cui, Guangdong (CN)

(73) Assignee: Shenzhen Mercury Optoelectronics Research Institute, Shenzhen, Guangdong (CN)

( * ) Notice: Subject to any disclaimer, the term of this patent is extended or adjusted under 35 U.S.C. 154(b) by 73 days.

(21) Appl. No.: 14/585,442

(22) Filed: Dec. 30, 2014

(65) Prior Publication Data

US 2015/0189173 A1   Jul. 2, 2015

(30) Foreign Application Priority Data

Dec. 30, 2013   (CN) .......................... 2013 1 0746592

(51) Int. Cl.

| G02F 1/133 | (2006.01) |
|---|---|
| H04N 5/238 | (2006.01) |
| H04N 5/225 | (2006.01) |
| G02F 1/137 | (2006.01) |
| G02F 1/29 | (2006.01) |

(52) U.S. Cl.
CPC .......... *G02F 1/137* (2013.01); *G02F 1/13306* (2013.01); *G02F 1/29* (2013.01); *H04N 5/2254* (2013.01); *H04N 5/238* (2013.01)

(58) Field of Classification Search
CPC .. H04N 5/23229; H04N 5/2258; G03B 13/34; G02F 1/29; G02F 1/13306; G02F 1/137
See application file for complete search history.

(56) References Cited

U.S. PATENT DOCUMENTS

| 8,033,054 B2 * | 10/2011 | Galstian ................. C09K 19/02 49/57 |
| 2013/0113889 A1 * | 5/2013 | Chen .................... H04N 5/2257 348/47 |

* cited by examiner

*Primary Examiner* — Joel Fosselman
*Assistant Examiner* — Fayez Bhuiyan
(74) *Attorney, Agent, or Firm* — Andrew C. Cheng (57) ABSTRACT

The present invention provides a liquid crystal lens image forming device and an image forming method. The image forming device includes: at least one liquid crystal lens; a drive circuit, which is connected to the liquid crystal lens to set, at a first moment, the liquid crystal lens in a non-lens state and to set, at a second moment, the liquid crystal lens in a lens state; at least one image pick-up unit generating a first image signal and a second image signal; and an image processing unit, which processes the first image signal and the second image signal to form a target image signal. The liquid crystal lens image forming device and image forming method do not involve the use of a polarization device, allows a single liquid crystal lens to clearly form an image, and reduces the thickness of the entire image forming device.

18 Claims, 3 Drawing Sheets

LIQUID CRYSTAL LENS IMAGE FORMING DEVICE AND LIQUID CRYSTAL LENS IMAGE FORMING METHOD

CROSS REFERENCE TO RELATED APPLICATIONS

This application claims priority of Chinese Patent Application No. 201310746592.7, filed on Dec. 30, 2013, the entire contents of which are incorporated by reference herein.

BACKGROUND OF THE INVENTION

1. Field of the Invention

The present invention relates to the technical field of lens imaging, and in particular to a liquid crystal lens image forming device and a liquid crystal lens image forming method.

2. The Related Arts

Due to the anisotropic property of liquid crystal material, a liquid crystal device is often applied to polarized light. When a liquid crystal lens is used in an image forming device, a polarization device must be included, such as a polarization film, in order to set the incident light in a polarized state. However, due to the polarization film, the light intensity is reduece to lower than one half of the initial intensity. In a comparatively dark environment, this situation may result in insufficient light for an image transducer, leading to reduction of signal-to-noise ratio, and thus deteriorating the quality of image formation.

In order to avoid the use of a polarization film, a liquid crystal lens that is composed of a combination of multiple stacked liquid crystal lens of which the liquid crystal layers are of initial alignments that are perpendicular to each other is used in an image forming system, or alternatively, a liquid crystal lens can be designed to include multiple stacked liquid crystal layers of which the initial alignments are perpendicular to each other. Each of the liquid crystal lenses or each of the liquid crystal layers individually handle two polarization light components so as to achieve applicability to environments of any polarization states. Such solutions, however, suffer the following problems.

(1) The solution of multiple stacked liquid crystal lenses or the solution of multiple stacked liquid crystal layers requires an increase of the number of the liquid crystal lenses or the liquid crystal layers and thus the manufacturing cost of the liquid crystal lens is greatly raised.

(2) Due to the increase of the number of the liquid crystal lenses or the liquid crystal layers, the thickness of the device is also increased, making it difficult for the liquid crystal lens forming device to be used in a mobile device.

(3) Since the liquid crystal lenses or the liquid crystal layers are set in different locations in the system, the propagation behaviors of the components of polarized light are not completely consistent with each other, making the quality of image formation of the system deteriorated.

Thus, it is a technical issue to be addressed to reduce the thickness of a lens structure and at the same time to overcome the problem of directly forming an image through a liquid crystal lens without using a polarization film.

SUMMARY OF THE INVENTION

In light of at least one of the above problems, the present invention aims to provide a novel liquid crystal lens image forming device, wherein the liquid crystal lens image forming device uses no polarization device and does not cause an increase of the thickness of the image forming device by adopting multiple liquid crystal lenses (layers) stacked over each other.

The present invention provides a liquid crystal lens image forming device, which comprises: at least one liquid crystal lens; a drive circuit, which is connected to the liquid crystal lens to set, at a first moment, the liquid crystal lens in a non-lens state (also namely a non-working state) and to set, at a second moment, the liquid crystal lens in a lens state (also namely a working state); at least one image pick-up unit, the image pick-up unit being arranged to pick up a first light signal passing through the liquid crystal lens at the first moment and to generate a first image signal in response to the first light signal and to pick up a second light signal passing through the liquid crystal lens at the second moment and to generate a second image signal in response to the second light signal; and an image processing unit, which is connected to the image pick-up unit to receive both the first image signal and the second image signal and to process the first image signal and the second image signal to obtain a processed image signal as a target image signal.

In the above embodiment, a high quality image can be obtained without stacking multiple liquid crystal lenses (for only one liquid crystal lens is necessary). Thus, the thickness of the liquid crystal lens image forming structure is reduced. The liquid crystal lens image forming method according to the present invention allows for the retrieval of a high quality image without using a polarization film and also allows for reduction of the thickness of the liquid crystal lens image forming device.

In the above technical solution, preferably, the image processing unit comprises: a computation unit, which removes an image signal generated with an light signal that is not modulated by the liquid crystal lens from the second image signal in order to obtain the target image signal, wherein the image generated with the light signal that is not modulated by the liquid crystal lens is obtained with the first image signal.

Since the liquid crystal lens can only modulate the light component in a specific polarization direction, the image signal that is obtained at the second moment contains an image signal generated by an un-modulated light signal (namely the polarized light component that is in the polarization direction perpendicular to the modulated polarization direction). Such an image signal affects the image quality. Thus, it is necessary to remove the un-modulated light signal from the entire light signal obtained at the second moment. The un-modulated light signal can be obtained with the light signal obtained at the first moment.

In each of the above technical solutions, preferably, the computing unit is operable with the following equation to obtain the target image signal: $I_3 = I_2 - \alpha \cdot I_1$, wherein $I_3$ is the target image signal; $I_1$ is the first image signal; $I_2$ is the second image signal; $\alpha$ is a polarization state anisotropic factor indicating the ratio of the polarization light component that is not modulated by the liquid crystal lens in the incident light; and $\alpha \cdot I1$ is the image signal generated with the light signal that is not modulated by the liquid crystal lens.

Since the retrieval of the image signal is only related to one liquid crystal lens and noise light signal is only an light signal of one component, the determination of the $\alpha$ factor is only related to the difference of polarization states of the incident light. The light signal can be divided into x-directional component and y-directional component and the $\alpha$ factor can be determined according to the components of the incident light in various directions. Thus, the difference of polarization states of the incident light can be detected in a real time manner and then a suitable α for the current condition can be determined.

In each of the above technical solutions, preferably, the image processing unit further comprises: a first anisotropic factor determination unit, which within a predetermined range of value, adjusts the value of the polarization state anisotropic factor according to a first predetermined interval, calculates the quality characteristic determination of the target image signal corresponding to each of the values of the polarization state anisotropic factor, and sets the polarization state anisotropic factor corresponding to the image having the maximal quality characteristic determination as the polarization state anisotropic factor of the liquid crystal lens image forming device.

In another embodiment, the difference of the polarization states of the incident light is not detected and each value of α factor is entered directly to then obtain an output of an image signal corresponding to each value of α factor. The image signals are compared to identify the α factor that corresponds to the image signal having the best image quality. The α factor so obtained in a α factor having coarse accuracy. The smaller the first predetermined interval is, the more accurate the value of α factor will be. Such a process may be referred to as a α factor search process, wherein in an initial search (rough search), the first predetermined interval may be set larger in order to quickly identify a suitable value for α factor.

In each of the above technical solutions, preferably, the image processing unit further comprises: a second anisotropic factor determination unit, which after the first anisotropic factor determination unit selects the polarization state anisotropic factor according to the first predetermined interval, adjusts the values of the polarization state anisotropic factor within a predetermined range shifting frontwards and rearward of the selected polarization state anisotropic factor according to a second predetermined interval, calculates a quality characteristic determination of a finally formed image obtained with each of the values of the polarization state anisotropic factor, and sets the polarization state anisotropic factor that corresponds to the target image signal having the greatest the quality characteristic determination as the polarization state anisotropic factor of the liquid crystal lens image forming device, wherein the second predetermined interval is smaller than the first predetermined interval. The quality characteristic determination is used to assess if the quality of an image is good or bad. For example, normalized variance may be used to assess the quality of an image, wherein what are primarily assessed are contrast and brightness of an image, but assessment is not limited to the contrast and brightness of the image, other factors of the image being also taken into consideration, such as signal-to-noise ratio.

After a coarse search has been conducted, a refined search (namely a second search) may be carried out. With the α factor determined in the first search as a reference, the search is conducted in a predetermined range covering ranges in front of and behind the reference and in the current search, a second predetermined interval that is smaller than the first predetermined interval used in the first search is used in order to more precisely determined the value of the α factor.

In each of the above-described technical solutions, preferably, the predetermined range is greater than or equal to 0 and smaller than 1.

In each of the above-described technical solutions, preferably, for the incident light that entering the liquid crystal lens being natural light, the value of the polarization state anisotropic factor α is set to ½ and the target image signal has a quality characteristic determination that is highest.

In each of the above-described technical solutions, preferably, in the condition that the incident light that enters the liquid crystal lens shows a ratio of 3:7 of the light intensity in the x polarization direction with respect to the light intensity of the y polarization direction, when the scale factor calculated with the image processing unit is 0.7, the quality of the target image signal is the best.

In each of the above-described technical solutions, preferably, the interval between the first moment and the second moment is less than a predetermined time period. To ensure that the difference between the incident light at the first moment and the incident light of the second moment is extremely small, the time period of the interval between the first moment and the second moment is as short as possible.

In each of the above-described technical solutions, preferably, the image processing unit is further connected to the drive circuit to apply a control signal to the drive circuit according to the image characteristics of the target image signal. The drive circuit adjusts the voltage applied to the liquid crystal lens according to the control signal.

In order to obtain an image having a high quality characteristic determination, the image processing unit may further perform analysis on the finally obtained image and control and adjust the voltage applied to the liquid crystal lens according to the result of analysis so as to obtain an image with improved performance.

In each of the above-described technical solutions, preferably, the liquid crystal lens is made up of a liquid crystal micro-lens array. Alignment layers of micro-lenses of the liquid crystal micro-lens array are of rubbing directions that are parallel.

In each of the above-described technical solutions, preferably, setting the liquid crystal lens in the lens state at the second moment indicates a state where a voltage of the drive circuit is adjusted to render an image generated by the light signal passing through the liquid crystal lens having a maximal quality characteristic determination.

According to another aspect of the present invention, a liquid crystal lens image forming method is further provided, comprising: at a first moment, setting a liquid crystal lens in a non-lens state, picking up a first light signal that passes through the liquid crystal lens at the first moment, and generating a first image signal in response to the first light signal; at a second moment, setting the liquid crystal lens in a lens state, picking up a second light signal that passes through the liquid crystal lens at the second moment, and generating a second image signal in response to the second light signal; and processing the first image signal and the second image signal and setting an image signal obtained through the processing as an image signal for finally-formed image.

The liquid crystal lens image forming method according to the present invention allows for the retrieval of a high quality image without using a polarization film and also allows for reduction of the thickness of the liquid crystal lens image forming device.

In each of the above-described technical solutions, preferably, the processing applied to the first image signal and the second image signal may specifically comprises: removing an image signal that is generated by an light signal that is not modulated by the liquid crystal lens from the second image signal in order to obtain the target image signal, wherein the image generated with the light signal that is not modulated by the liquid crystal lens is obtained with the first image signal.

Since the liquid crystal lens can only modulate the light component in a specific polarization direction, the image signal that is obtained at the second moment contains an image signal generated by an un-modulated light signal (namely the polarized light component that is in the polarization direction that is normal to the modulated polarization direction). Such an image signal affects the image quality. Thus, it is necessary to remove the un-modulated light signal from the entire light signal obtained at the second moment. The un-modulated light signal can be obtained with the light signal obtained at the first moment.

In each of the above-described technical solutions, preferably, the target image signal is obtained with the following equation: $I_3=I_2-\alpha \cdot I_1$, wherein $I_3$ is the target image signal; $I_1$ is the first image signal; $I_2$ is the second image signal; $\alpha$ is a polarization state anisotropic factor indicating the ratio of the polarization light component that is not modulated by the liquid crystal lens in the incident light; and $\alpha \cdot I1$ is the image signal generated with the light signal that is not modulated by the liquid crystal lens.

Since the retrieval of the image signal is only related to one liquid crystal lens and noise light signal is only a light signal of one component, the determination of the $\alpha$ factor is only related to the difference of polarization states of the incident light. The light signal can be divided into x-directional component and y-directional component and the $\alpha$ factor can be determined according to the components of the incident light in various directions. Thus, the difference of polarization states of the incident light can be detected in a real time manner and then a suitable $\alpha$ for the current condition can be determined.

In each of the above-described technical solutions, preferably, the method for determining the polarization state anisotropic factor comprises: within a predetermined range of value, adjusting the value of the polarization state anisotropic factor according to a first predetermined interval, calculating the quality characteristic determination of the target image signal corresponding to each of the values of the polarization state anisotropic factor, and setting the polarization state anisotropic factor corresponding to the image having the maximal quality characteristic determination as the polarization state anisotropic factor of the liquid crystal lens image forming device.

In another embodiment, the difference of the polarization states of the incident light is not detected and each value of $\alpha$ factor is entered directly to then obtain an output of an image signal corresponding to each value of $\alpha$ factor. The image signals are compared to identify the $\alpha$ factor that corresponds to the image signal having the best image quality. The $\alpha$ factor so obtained in a $\alpha$ factor having coarse accuracy. The smaller the first predetermined interval is, the more accurate the value of $\alpha$ factor will be. Such a process may be referred to as a $\alpha$ factor search process, wherein in an initial search (rough search), the first predetermined interval may be set larger in order to quickly identify a suitable value for $\alpha$ factor.

In each of the above-described technical solutions, preferably, the method for determining the polarization state anisotropic factor further comprises: after the polarization state anisotropic factor is selected according to the first predetermined interval, adjusting the values of the polarization state anisotropic factor within a predetermined range shifting frontwards and rearward of the selected polarization state anisotropic factor according to a second predetermined interval; and calculating a quality characteristic determination of a finally formed image obtained with each of the values of the polarization state anisotropic factor and setting the polarization state anisotropic factor that correspond to the target image signal having the greatest the quality characteristic determination as a final polarization state anisotropic factor, wherein the second predetermined interval is smaller than the first predetermined interval. The quality characteristic determination is used to assess if the quality of an image is good or bad. For example, normalized variance may be used to assess the quality of an image, wherein what are primarily assessed are contrast and brightness of an image, but assessment is not limited to the contrast and brightness of the image, other factors being also taken into consideration, such as signal-to-noise ratio.

After a coarse search has been conducted, a refined search (namely a second search) may be carried out. With the $\alpha$ factor determined in the first search as a reference, the search is conducted in a predetermined range covering ranges in front of and behind the reference and in the current search, a second predetermined interval that is smaller than the first predetermined interval used in the first search is used in order to more precisely determined the value of the $\alpha$ factor.

Since the liquid crystal lens image forming method according to the present invention does not involve the use of a polarization device, the entire intensity of the incident light can be preserved, making the details of an image picked up in a comparatively dark environment richer, allowing a single liquid crystal lens to form a clear image, and reducing the thickness of the liquid crystal lens structure.

DETAILED DESCRIPTION OF THE PREFERRED EMBODIMENTS

To better understand the above objects, features, and advantages of the present invention, a detailed description of the present invention will be given hereinafter with reference to the accompanied drawings and embodiments. It is noted here that the embodiments of the present invention and the features of the embodiments may be combined with each other if there is no conflict therebetween.

Specific details are given in the following description to help fully understand the present invention; however, the present invention can be embodied in other ways than what described herein. Thus, the present invention is not intended to be limited to the following disclosed embodiments.

Figure 1:
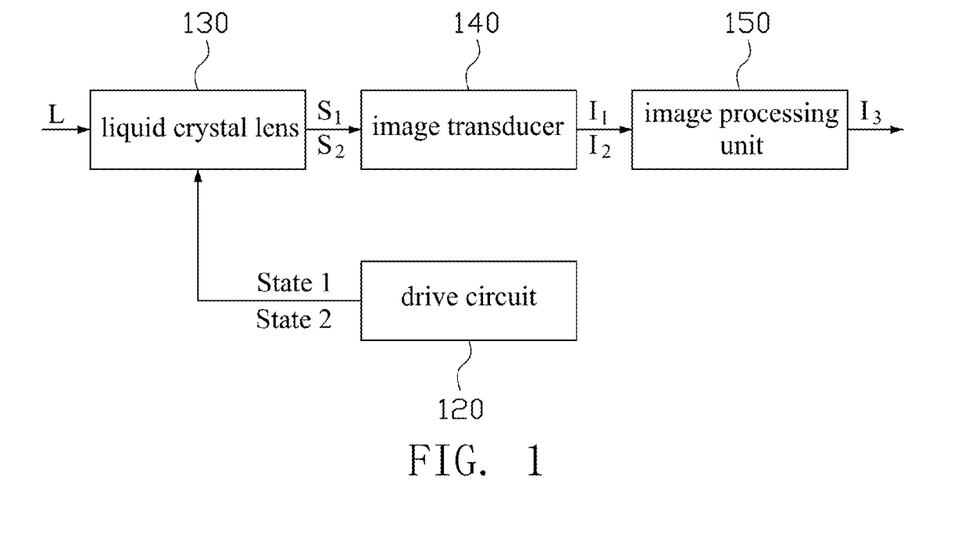
FIG. 1 is a schematic diagram showing a liquid crystal lens image forming device according to an embodiment of the present invention.

FIG. 1 shows a schematic diagram of a liquid crystal lens image forming device according to an embodiment of the present invention.

As shown in FIG. 1, the liquid crystal lens image forming device according to the present invention generally comprises a liquid crystal lens 130, an image transducer (the image pick-up unit) 140, an image processing unit 150, and a drive circuit 120, wherein an original incident light L enters the liquid crystal lens 130 and the image transducer 140 picks up an light signal passing through the liquid crystal lens 130 and generates, in response to the light signal, an image signal and transmits the generated image signal to the image processing unit 150. The image processing unit 150 performs analysis of the image signal and finally generates a target image signal and also analyses the structure of the image signal to output a control signal to the drive circuit 120. The drive circuit 120 responds to the control signal of the image processing unit 150 to adjust a voltage applied to the liquid crystal lens 130. The liquid crystal lens 130, after receiving the voltage of the drive circuit 120, causes the liquid crystal molecules to rotate so as to achieve modulation of the incident light L. The image processing unit 150 can be a programmable logic controller.

Except the liquid crystal lens, there are other optical components (such as glass or plastic optical lens). Since these other optical components are known, further description will be omitted herein.

In the instant embodiment, in State 1 (the first moment), the drive circuit 120 drives the liquid crystal lens 130 into a non-lens state (also namely a non-working state), wherein the liquid crystal lens 130 behaviors like glass and does not carry out modulation of the incident light L and under such a condition, the light signal passing through the liquid crystal lens 130 is $S_1$. The image transducer 140 picks up the light signal $S_1$ and generates an image signal $I_1$ according to the light signal $S_1$. In State 2 (the second moment), the drive circuit 120 drives the liquid crystal lens 130 into a lens state (also namely a working state), wherein the light signal passing through the liquid crystal lens 130 is $S_2$. The image transducer 140 picks up the light signal $S_2$ and generates an image signal $I_2$ according to the light signal $S_2$. The image processing unit 150 receives the image signals $I_1$ and $I_2$ respectively generated in the two states and processes the image signals $I_1$ and $I_2$ of the two states to finally generate a target image signal $I_3$, which is desired.

When without a polarization device, the liquid crystal lens image forming device according to the present invention may preserve or ensure the light intensity of the original incident light L. For an image transducer staying in the same condition, the design without polarization device allows for recognition or more details in a weak-light-intensity imaging environment. Further, compared to a typical optical image forming system that comprises multiple stacked liquid crystal lenses with initial alignments perpendicular to each other, the liquid crystal lens image forming device according to the present invention can be made thinner and lighter, making it more suitable for mobile devices, such as mobile phones and tablet computers, etc.

In general, since no polarization device is used, besides a useful polarization light component (subjected to convergence or divergence by the liquid crystal lens), the passed-through incident light L may also contain other useless polarization light components does not subjected to convergence or divergence by the liquid crystal lens, which will cause deterioration of quality characteristic determination of the final image. To overcome such a problem, the liquid crystal lens image forming device according to the present invention captures or obtains the image signals $I_1$ and $I_2$ respectively according to the light signals $S_1$ and $S_2$ of the non-lens state and the lens state and implements certain image processing with the two image signals $I_1$ and $I_2$ (such operation being carried out in the image processing unit 150), which substantially eliminates the influence caused by the useless light signal and eventually restores the image $I_3$ of high quality characteristic determination, such as clear and sharp image $I_3$.

The followings describe in detail the operation principle of the liquid crystal lens image forming device according to the present invention.

In the first state (the non-lens state), the drive circuit 120 does not apply driving voltage on the liquid crystal lens 130 or the applied driving voltage makes focal length of the liquid crystal lens 130 infinite. The liquid crystal lens 130 does not have modulation effect on the incident light L and the light signal $S_1$ passing through the liquid crystal lens 130 is expressed as follows:

$$S_1 = S_1^x + S_1^y \tag{1}$$

where x and y designates two mutually perpendicular polarization directions of a light signal (the original incident light L). Thus, the light signal $S_1$ can be decomposed into two light components respectively in the two directions. It is noted here that since the liquid crystal lens 130 of the present invention does not include a polarization device (such as a polarization film), both the x component and the y component of the incident light are preserved and pass through the liquid crystal lens 130 without any changes.

In the second state (the lens state), the drive circuit 120 applies a driving voltage on the liquid crystal lens 130, causing the polarized light modulated by the liquid crystal lens 130 to generate an image on the image transducer 140. The liquid crystal lens 130 has modulation effect on the incident light L in one specific polarization direction for convergence or divergence of the light signal. Without loss of generality, it is assumed that the specific polarization direction is the x direction and then, the liquid crystal lens does not have modulation effect on the y component perpendicular to the x component. Under this condition, the light signal $S_2$ passing through the liquid crystal lens can be expressed as follows:

$$S_2 = S_2^x + S_2^y \tag{2}$$

where $S_2^x$ is the x component of the incident light $S_2$, which is modulated by the liquid crystal lens 130, while $S_2^y$ is the y component of the incident light $S_2$, which is not modulated by the liquid crystal lens 130 and will deteriorate the quality characteristic determination of the image.

Under the condition that the liquid crystal lens 130 responds to the voltage quickly enough, it is possible to make the transient time, also referred to as time interval herein, from the first state to the second state short enough. That is, the time interval between the first moment and the second moment is controlled, as best as possible, to be less than a predetermined time period. With the predetermined time period, a shooting scene does not change significantly (such as factors including variation of light intensity, movement of an object in the scene, movement of the image forming device in the scene). This allows for a reasonable assumption that the incident light L is no change in the two states or the change, although occurred, is small enough to be ignored. Since liquid crystal lens 130 does not have modulation effect on the light component in y polarization direction in both the two states, the following is obtained:

$$S_2^y = S_1^y \quad (3)$$

Finally, the light signal $S_1$ and $S_2$ are subjected to signal processing as follows, wherein α is scale factor indicating the ratio of the y component (the light component that is not modulated by the liquid crystal lens 130 in the second state) in the incident light L:

$$S_3 = S_2 - \alpha \cdot S_1 \quad (4)$$

Combining equations (3) and (4) provides $$S_3 = S_2^x + S_2^y - a \cdot S_1^x - a \cdot S_1^y = S_2^x + [(1-\alpha)S_1^y - \alpha \cdot S_1^x] \quad (5)$$

Assuming $$\Delta = (1-\alpha)S_1^y - \alpha \cdot S_1^x \quad (6)$$

then, equation (5) can be simplified as follows:

$$S_3 = S_2^x + \Delta \quad (7)$$

where $S_2^x$ is the useful light signal that has been modulated by the liquid crystal lens 130 and Δ indicates an interference signal to be removed. It can be observed from equation (7), the target image signal obtained by the processing of the image processing unit 150 is only related to the convergent light or divergent light in the x polarization direction.

When the incident light L is natural light, namely the incident light is isotropic, being to eliminate the interference signal Δ, it can be inferred that $$\left. \begin{array}{l} S_1^x = S_1^y \\ \Delta = 0 \end{array} \right\} \Rightarrow \alpha = \frac{1}{2} \quad (8)$$

In other words, under the condition that the incident light is natural light, by setting the scale factor α=0.5 would allow the signal processing of equation (4) to effectively restore the useful light signal $S_3$ from the light signals $S_1$ and $S_2$. When α=0.5, the quality characteristic determination of the target image signal is the highest and the best imaging effect can be obtained.

Since the time interval between the two states is very short, the light signal that is incident on the image transducer has almost no variation of the intensity thereof. Thus, $S_1$ and $S_2$ are substantially equal to each other and are basically located in the same zone of the light intensity curve of the image transducer 140. Thus, the image signals $I_1$ and $I_2$ induced therefrom would have the same signal characteristics as that of the light signals $S_1$ and $S_2$. Thus, in an actual operation, it is possible to subject the images $I_1$ and $I_2$ obtained respectively in the first and second states to the image processing designated in equation (9) in order to remove the useless image signal section mixed with the image signal $I_2$ and to resume the image signal $I_3$ having the highest quality characteristic determination.

$$I_3 = I_2 - \alpha \cdot I_1 \quad (9)$$

When the incident light shows an anisotropic property, namely the x component and y component thereof being not equal to each other, α=0.5 is no longer applicable. Selection of the value of α is a key issue for resuming the high quality image. The instant embodiment further discloses a method that determines a suitable polarization state anisotropic factor α according to the quality of the processed image signal $I_3$ and finally generates a high quality image.

The polarization state anisotropic factor α has a range that is greater than or equal to 0 and less than or equal to 1. Various values of the polarization state anisotropic factor α can be applied to equation (9) to compute the quality characteristic determination of the image for each value of the polarization state anisotropic factor α. The polarization state anisotropic factor α having the highest quality characteristic determination will be selected as the finally determined suitable value of α.

For example, data are selected at an interval of 0.1 and thus, ten values of α are selected and the normalized variance of the image corresponding to each value of α is calculated, or the quality characteristic determination of the image is used instead. If it is found that the quality characteristic determination of the eighth image is the greatest, then the value 0.8 of α corresponding to the eighth image is taken as the final suitable value of α.

To obtain a finer value of α, on the basis of the above-described search process, a further search is conducted, where the value of α obtained in the first search process is taken as a reference and a refined search is conducted within a range covering a predetermined range in front of the reference and/or a predetermined range behind the reference.

For example, after the value of α is selected to be 0.8, a range covering a predetermined range before and after 0.8 is taken, namely a range converging between 0.75 and 0.85, for a refined search and in this search, an interval of 0.01 is taken so that in the range from 0.75 to 0.85, the quality characteristic determinations of ten images are calculated. If, assuming, the quality characteristic determination of the third image is the highest, then the final suitable value of α is set to be 0.78. When the computation speed permits, a third search may be conducted, and the like.

Figure 2:
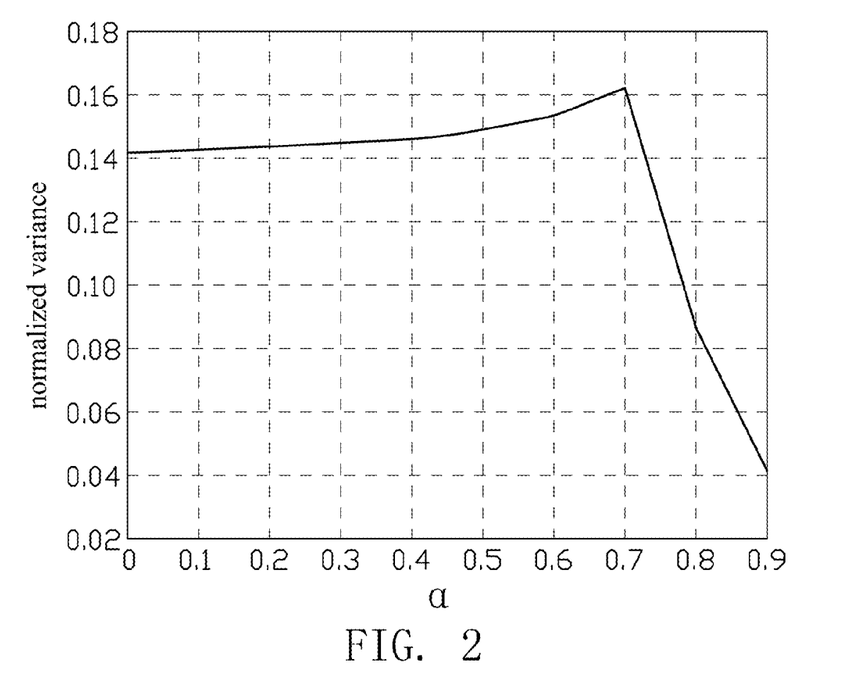
FIG. 2 is a plot showing the influence of an image quality characteristic determination by $\alpha$ factor.

When the incident light is anisotropic, empirical tests show the value of α reflects such anisotropic characteristics of the incident light. Experimental simulation reveals that for the ratio between the intensities of the x component and the y component of the original incident light being 3:7, the quality characteristic determinations of the images $I_3$ obtained with different values of α show the quality characteristic determination achieves the maximum for the $I_3$ image obtained with α value of 0.7 (namely 7/(3+7)). FIG. 2 provides result of experiments, where the quality characteristic determination is the normalized variance of the entire image $I_3$.

Based on the above analysis, various values of α can be set according to equation (9) in order to different image $I_3$. For each image $I_3$ so generated, a quality characteristic determination (such as the normalized variance used in the above-discussed experiments) is calculated. When the quality characteristic determination reaches an extreme, the corresponding value of α reflects the actual anisotropy of the polarization and the image corresponding thereto will be of the best result.

Figure 3:
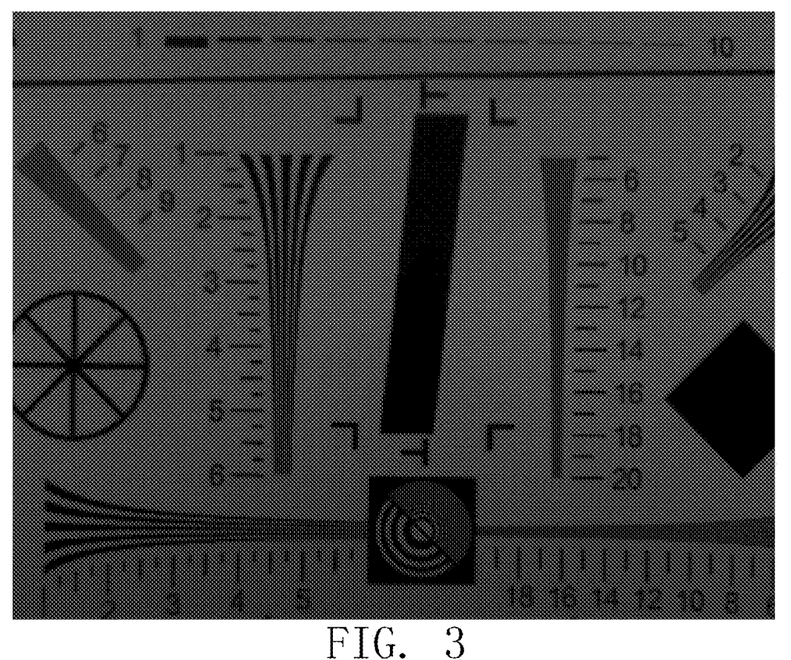
FIG. 3 shows a screen displaying an image obtained with the liquid crystal lens image forming device according to the embodiment of the present invention at a first moment.
Figure 4:
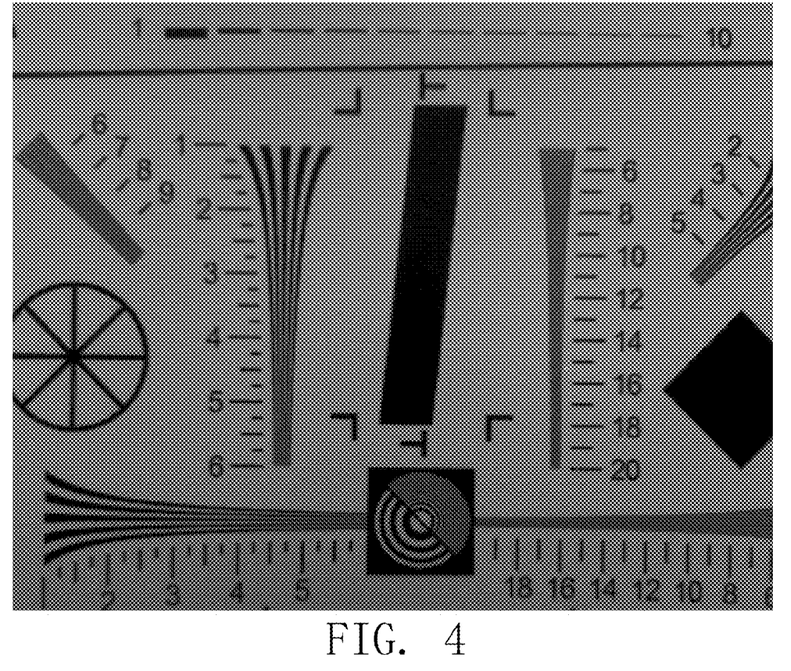
FIG. 4 shows a screen displaying an image obtained with the liquid crystal lens image forming device according to the embodiment of the present invention at a second moment.
Figure 5:
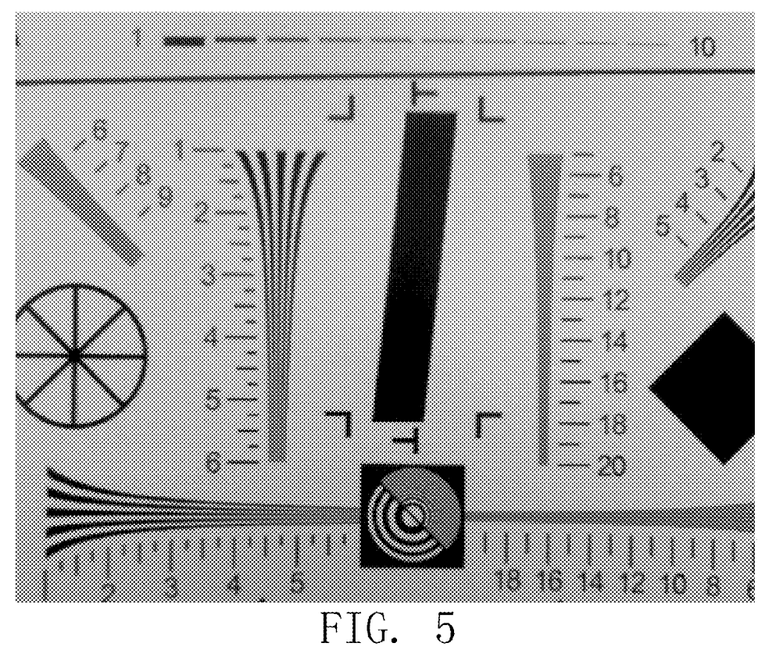
FIG. 5 shows a screen displaying an image generated with image processing performed with the liquid crystal lens image forming device according to the embodiment of the present invention.

FIG. 3 shows an image obtained in the first state, wherein the incident light is not modulated by the liquid crystal lens 130. FIG. 4 shows an image obtained in the second state, wherein a polarization light component of the incident light is modulated by the liquid crystal lens 130. FIG. 5 shows a final generated image after image processing of equation (9) have been adopted by using the best value of α obtained with the method disclosed in the present invention. It can be seen from FIG. 5 that the overall brightness of the image has been improved and the clearness has also been enhanced.

The conventional liquid crystal lens image forming device requires a polarization device, such as a polarization film, to be arranged in front of the liquid crystal lens 130. Without loss of generality, assuming the y-direction light signal is blocked by the polarization device and only the x-direction light signal is allowed to pass through the polarization device to be converged or diverged by the liquid crystal lens 130. In other words, the light signal received by the image transducer is $S_2^x$ of equation (2), which means the light intensity of the light signal is greatly reduced after passing through the polarization device. When the light signal received by the image transducer 140 is very weak, the electrical signal induced thereby is also very weak and the intensity of the electrical signal may even get lower than the intensity of noise. This leads to loss of image details when taking an image in a comparatively dark environment and the signal-to-noise ratio gets lowered, making it impossible to recovery the image even being subjected to post processing.

The conventional liquid crystal lens image forming device often adopts a solution of stacking multiple liquid crystal lenses if no polarization device is used. This makes the thickness of the entire liquid crystal lens image forming device increased, this violating the requirement for the device to be thin and compact.

The liquid crystal lens image forming device according to the present invention includes no polarization device. In both the first state and the second state, the light signals $S_1$ and $S_2$ that pass through the liquid crystal lens 130 preserve the whole energy in all polarization directions. For a light signal that is strong, the image transducer 140 can readily detect the minute variation of the light signal and this makes the details of the image so generated rich. Thus, compared to the conventional liquid crystal lens image forming system with a polarization device, the present invention can significantly improve the imaging result performed in dimmed surrounding light.

The liquid crystal lens imaging device according to the present invention allows for liquid crystal lenses to be arranged in an array so that compared to the conventional liquid crystal lens imaging device in which multiple liquid crystal lenses are stacked, the present invention can greatly reduce the thickness of the liquid crystal lens imaging device, making it possible to be suitable for a thin and compact device.

The liquid crystal lens can be a liquid crystal micro-lens array. In the liquid crystal micro-lens array, rubbing directions of the alignment layers of all the liquid crystal micro-lenses are parallel to each other. Using a liquid crystal micro-lens array provides the following advantages: the image forming device can be made much thinner and lighter and the liquid crystal lens responds faster to voltage.

Figure 6:
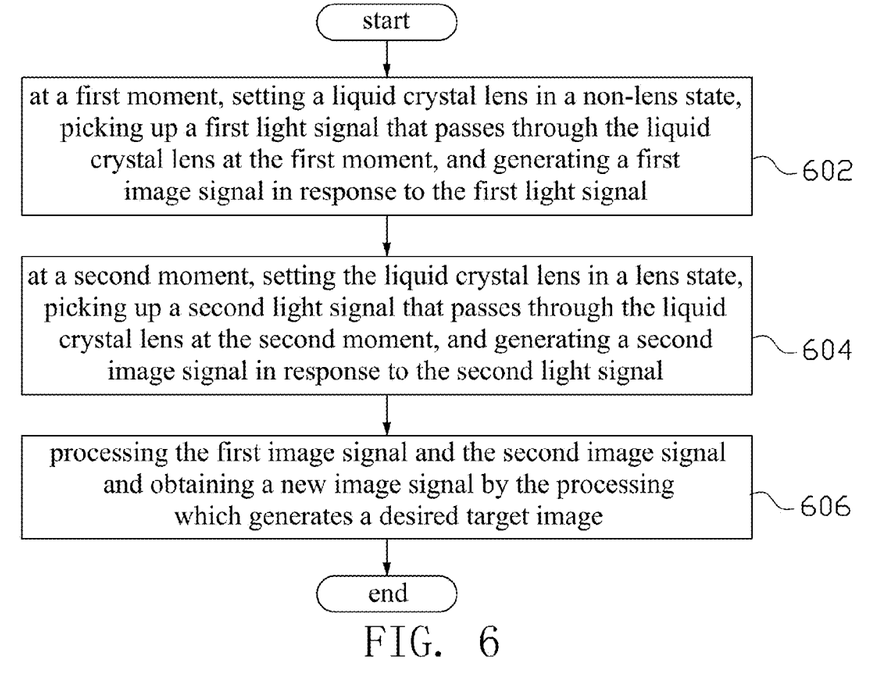
FIG. 6 is a flow chart illustrating a liquid crystal lens image forming method according to an embodiment of the present invention.

FIG. 6 shows a flow chart illustrating a liquid crystal lens image forming method according to an embodiment of the present invention.

As shown in FIG. 6, a liquid crystal lens image forming method according to an embodiment of the present invention comprises the following steps:

Step 602: at a first moment, setting a liquid crystal lens in a non-lens state, picking up a first light signal that passes through the liquid crystal lens at the first moment, and generating a first image signal in response to the first light signal; Step 604: at a second moment, setting the liquid crystal lens in a lens state, picking up a second light signal that passes through the liquid crystal lens at the second moment, and generating a second image signal in response to the second light signal; Step 606: processing the first image signal and the second image signal and obtaining a new image signal by the processing which generates a desired target image.

On the one hand, each image pick-up unit corresponds to one liquid crystal lens and the image processing unit can provide a high quality image based on the light signal passing through one liquid crystal lens. In other words, a high quality image can be obtained without stacking multiple liquid crystal lenses (for only one liquid crystal lens is necessary). Thus, the thickness of the liquid crystal lens image forming device is reduced. On the other hand, in order to obtain a high quality image especially without using a polarization film, in the above embodiment, a unique control manner is adopted, wherein at the first moment, the drive circuit drives the liquid crystal lens into the non-lens state, where the liquid crystal lens does not have modulation effect of convergence or divergence on the incident light and functions like a piece of glass; at the second moment, the drive circuit drives the liquid crystal lens into the lens state, where the liquid crystal lens has modulation effect of convergence or divergence of the incident light. Image signals are received respectively in the two moments and are processed to substantially eliminate the influence resulting from the undesired light signal and to obtain a high quality image. Thus, the liquid crystal lens image forming method according to the present invention allows for the retrieval of a high quality image without using a polarization film and also allows for reduction of the thickness of the liquid crystal lens image forming device.

In each of the above-described technical solutions, preferably, the processing applied to the first image signal and the second image signal may specifically comprises: removing an image signal that is generated by an light signal that is not modulated by the liquid crystal lens from the second image signal in order to obtain the target image signal, wherein the image signal generated by the light signal that is not modulated by the liquid crystal lens is the first image signal.

Since the liquid crystal lens can only modulate the light component in a specific polarization direction, the image signal that is obtained at the second moment contains an image signal generated by an un-modulated light signal (namely the polarized light component that is in the polarization direction that is normal to the modulated polarization direction). Such the image signal deteriorates the image quality. Thus, it is necessary to remove the un-modulated light signal from the entire light signal obtained at the second moment. The un-modulated light signal can be obtained by the light signal obtained at the first moment.

In each of the above-described technical solutions, preferably, the target image signal is obtained with the following equation: $I_3=I_2-\alpha \cdot I_1$, wherein $I_3$ is the target image signal; $I_1$ is the first image signal; $I_2$ is the second image signal; $\alpha$ is a polarization state anisotropic factor indicating the ratio of the polarization light component that is not modulated by the liquid crystal lens in the incident light; and $\alpha \cdot I1$ is the image signal generated with the light signal that is not modulated by the liquid crystal lens.

Since the obtained image signal is only associated with one liquid crystal lens and interference light signal is only being with a certain component, the determination of the $\alpha$ factor is based on only the difference of polarization states of the incident light. The light signal can be divided into x-directional component and y-directional component and the $\alpha$ factor can be determined according to the components of the incident light in various directions. Thus, the difference of polarization states of the incident light can be detected in a real time manner and then a suitable α for the current condition can be determined.

In each of the above-described technical solutions, preferably, the method for determining the polarization state anisotropic factor comprises: within a predetermined range of value, adjusting the value of the polarization state anisotropic factor according to a first predetermined interval, calculating the quality characteristic determination of the target image signal corresponding to each of the values of the polarization state anisotropic factor, and setting the polarization state anisotropic factor corresponding to the image having the maximal quality characteristic determination as the polarization state anisotropic factor of the liquid crystal lens image forming device.

In another embodiment, each value of α factor is entered directly to then obtain an image signal corresponding to each value of α factor. In this case, there is no detection of the difference of the polarization states of the incident light. The obtained image signals are compared to identify the α factor that corresponds to the image signal having the best image quality. The α factor so obtained may be an initial coarse value of a finally-determined α factor. The smaller the first predetermined interval is, the more accurate the value of α factor will be. Such a process may be referred to as a α factor search process, wherein in an initial search (rough search), the first predetermined interval may be set larger in order to quickly identify a suitable value for α factor.

In each of the above-described technical solutions, preferably, the method for determining the polarization state anisotropic factor further comprises: after the polarization state anisotropic factor is selected according to the first predetermined interval, adjusting the values of the polarization state anisotropic factor within a predetermined range shifting frontwards and rearward of the selected polarization state anisotropic factor according to a second predetermined interval; and calculating a quality characteristic determination of a finally formed image obtained with each of the values of the polarization state anisotropic factor and setting the polarization state anisotropic factor that correspond to the target image signal having the greatest the quality characteristic determination as the finally-determined polarization state anisotropic factor, wherein the second predetermined interval is smaller than the first predetermined interval. The quality characteristic determination is used to assess if the quality of an image is good or bad. For example, normalized variance may be used to assess the quality of an image, wherein what are primarily assessed are contrast and brightness of an image, but assessment is not limited to the contrast and brightness of the image, other factors of the image being also taken into consideration, such as signal-to-noise ratio.

After a coarse search has been conducted, a refined search (namely a second search) may be carried out. With the α factor determined in the first search as a reference, the refined search is conducted in a predetermined range covering ranges in front of and behind the reference. In the current refined search, a second predetermined interval that is smaller than the first predetermined interval used in the first search is used in order to more precisely determine the value of the α factor.

In each of the above-described technical solutions, preferably, the predetermined range is greater than or equal to 0 and smaller than or equal to 1.

In each of the above-described technical solutions, preferably, for the incident light that entering the liquid crystal lens being natural light, the value of the polarization state anisotropic factor α is set to ½ and the target image signal has a highest quality characteristic determination.

In each of the above-described technical solutions, preferably, the interval between the first moment and the second moment is less than a predetermined time period. To ensure that the difference between the incident light at the first moment and the incident light of the second moment is extremely small, the time period of the interval between the first moment and the second moment is as less as possible.

In each of the above-described technical solutions, preferably, the liquid crystal lens is made up of a liquid crystal micro-lens array. Rubbing directions of the alignment layers of micro-lenses of the liquid crystal micro-lens array are parallel to each other.

In each of the above-described technical solutions, preferably, the second moment, which the liquid crystal lens is set in the lens state, is a state where a voltage of the drive circuit is adjusted to render an image generated by the light signal passing through the liquid crystal lens having a maximal quality characteristic determination.

Since the liquid crystal lens image forming method according to the present invention does not involve the use of a polarization device, the entire intensity of the incident light can be preserved, making the details of an image picked up in a comparatively dark environment richer, allowing a single liquid crystal lens to form a clear image, and reducing the thickness of the liquid crystal lens structure.

In the previous description, preferred embodiments of the present invention are provided for illustration, not to limit the scope of the present invention. Those having ordinary skills of the art may appreciate various modifications and variations of the present invention. Modification, substitutes of equivalents, and improvements, which fall within the scope of the spirit and principle of the present invention, are considered with the scope of protection of the present invention.

What is claimed is:

1. A liquid crystal lens image forming device, comprising:
    at least one liquid crystal lens;
    a drive circuit, which is connected to the liquid crystal lens to set, at a first moment, the liquid crystal lens in a non-lens state and to set, at a second moment, the liquid crystal lens in a lens state;
    at least one image pick-up unit, the image pick-up unit being arranged to pick up a first light signal passing through the liquid crystal lens at the first moment and to generate a first image signal in response to the first light signal and to pick up a second light signal passing through the liquid crystal lens at the second moment and to generate a second image signal in response to the second light signal; and
    an image processing unit, which is connected to the image pick-up unit to receive both the first image signal and the second image signal and to process the first image signal and the second image signal to obtain a processed image signal as a target image signal;
    wherein the image processing unit processes the first image signal and the second image signal based on the following equation to obtain the target image signal:

$$I_3 = I_2 - \alpha \cdot I_1$$

wherein $I_3$ is the target image signal; $I_1$ is the first image signal; $I_2$ is the second image signal; $\alpha$ is a polarization state anisotropic factor indicating the ratio of the polarization light component that is unmodulated by the liquid crystal lens in the incident light; and $\alpha \cdot I_1$ represents the image signal generated with the light signal that is unmodulated by the liquid crystal lens.

2. The liquid crystal lens image forming device as claimed in claim 1, wherein the image processing unit comprises:
a computation unit, which removes an image signal generated with an light signal that is unmodulated by the liquid crystal lens from the second image signal, thereby obtain the target image signal, wherein the image signal generated with the light signal that is unmodulated by the liquid crystal lens is obtained with the first image signal.

3. The liquid crystal lens image forming device as claimed in claim 1, wherein the image processing unit further comprises:
a first anisotropic factor determination unit, which within a predetermined range of value, adjusts the value of the polarization state anisotropic factor according to a first predetermined time interval, calculates the quality characteristic determination of the target image signal corresponding to each of the values of the polarization state anisotropic factor, and sets the polarization state anisotropic factor corresponding to the image having the maximal quality characteristic determination as the polarization state anisotropic factor of the liquid crystal lens image forming device.

4. The liquid crystal lens image forming device as claimed in claim 3, wherein the image processing unit further comprises:
a second anisotropic factor determination unit, which after the first anisotropic factor determination unit selects the polarization state anisotropic factor according to the first predetermined time interval, adjusts the values of the polarization state anisotropic factor within a predetermined range shifting frontwards and rearward of the selected polarization state anisotropic factor according to a second predetermined interval, calculates a quality characteristic determination of a finally formed image obtained with each of the values of the polarization state anisotropic factor, and sets the polarization state anisotropic factor that corresponds to the target image signal having the greatest quality characteristic determination as the polarization state anisotropic factor of the liquid crystal lens image forming device, wherein the second predetermined interval is smaller than the first predetermined interval.

5. The liquid crystal lens image forming device as claimed in claim 3, wherein the predetermined range of value is greater than or equal to 0 and smaller than or equal to 1.

6. The liquid crystal lens image forming device as claimed in claim 1, wherein for the incident light that entering the liquid crystal lens being natural light, the value of the polarization state anisotropic factor $\alpha$ is set to $\frac{1}{2}$.

7. The liquid crystal lens image forming device as claimed in claim 1, wherein a time interval between the first moment and the second moment is less than a predetermined time period in which the incident light entering the liquid crystal lens is no change in the two moments or the change is small enough to be ignored.

8. The liquid crystal lens image forming device as claimed in claim 1, wherein the liquid crystal lens is a liquid crystal micro-lens array, rubbing directions of alignment layers of the liquid crystal micro-lenses are parallel to each other.

9. The liquid crystal lens image forming device as claimed claim 1, wherein setting the liquid crystal lens in the lens state at the second moment indicates a state where a voltage of the drive circuit is adjusted to render an image generated by the light signal passing through the liquid crystal lens having a maximal quality characteristic determination.

10. A liquid crystal lens image forming method, comprising:
at a first moment, setting a liquid crystal lens in a non-lens state, picking up a first light signal that passes through the liquid crystal lens at the first moment, and generating a first image signal in response to the first light signal;
at a second moment, setting the liquid crystal lens in a lens state, picking up a second light signal that passes through the liquid crystal lens at the second moment, and generating a second image signal in response to the second light signal; and
processing the first image signal and the second image signal and setting an image signal obtained through the processing as a target image signal for finally-formed image;
wherein the target image signal is obtained with the following equation:

$$I_3 = I_2 - \alpha \cdot I_1$$

wherein $I_3$ is the target image signal; $I_1$ is the first image signal; $I_2$ is the second image signal; $\alpha$ is a polarization state anisotropic factor indicating the ratio of the polarization light component that is not modulated by the liquid crystal lens in the incident light; and $\alpha \cdot I1$ is the image signal generated with the light signal that is not modulated by the liquid crystal lens.

11. The liquid crystal lens image forming method as claimed in claim 10, wherein the processing of the first image signal and the second image signal comprises:
removing an image signal that is generated by an light signal that is not modulated by the liquid crystal lens from the second image signal in order to obtain the target image signal, wherein the image generated with the light signal that is not modulated by the liquid crystal lens is obtained with the first image signal.

12. The liquid crystal lens image forming method as claimed in claim 10, wherein a method for determining the polarization state anisotropic factor comprises:
within a predetermined range of value, adjusting the value of the polarization state anisotropic factor according to a first predetermined interval, calculating the quality characteristic determination of the target image signal corresponding to each of the values of the polarization state anisotropic factor, and setting the polarization state anisotropic factor corresponding to the image having the maximal quality characteristic determination as the polarization state anisotropic factor of the liquid crystal lens image forming device.

13. The liquid crystal lens image forming method as claimed in claim 12, wherein the method for determining the polarization state anisotropic factor further comprises:
after the polarization state anisotropic factor is selected according to the first predetermined interval, adjusting the values of the polarization state anisotropic factor within a predetermined range shifting frontwards and rearward of the selected polarization state anisotropic factor according to a second predetermined interval; and
calculating a quality characteristic determination of a finally formed image obtained with each of the values of the polarization state anisotropic factor and setting the polarization state anisotropic factor that correspond to the target image signal having the greatest the quality characteristic determination as a final polarization state anisotropic factor, wherein the second predetermined interval is smaller than the first predetermined interval.

14. The liquid crystal lens image forming method as claimed in claim 12, wherein the predetermined range is greater than or equal to 0 and smaller than 1.

15. The liquid crystal lens image forming method as claimed in claim 10, wherein for the incident light that entering the liquid crystal lens being natural light, the value of the polarization state anisotropic factor $\alpha$ is set to ½.

16. The liquid crystal lens image forming method as claimed in claim 10, wherein the polarization state anisotropic factor is determined according to an x-directional component and a y-directional component of the incident light.

17. The liquid crystal lens image forming method as claimed in claim 10, wherein the polarization state anisotropic factor is determined by supplying and applying multiple candidate values of the polarization state anisotropic factor that are spaced at a first predetermined interval to obtain multiple image signals respectively corresponding to the multiple candidate values of the polarization state anisotropic factor and identifying one of the image signals that has the best quality, whereby the polarization state anisotropic factor being determined as the candidate value that corresponds to the image signal having the best quality.

18. The liquid crystal lens image forming method as claimed in claim 17, wherein a range that covers the polarization state anisotropic factor so determined is selected and multiple secondary candidate values of the polarization state anisotropic factor that are spaced by a second predetermined interval are selected from the range, the secondary candidate values being applied to obtain multiple additional image signals respectively corresponding to the secondary candidate values of the polarization state anisotropic factor, one of the additional image signals that has the best quality being identified to thereby further determine the polarization state anisotropic factor as the secondary candidate value that corresponds to the image signal having the best quality.

\* \* \* \* \*